(12) United States Patent
Forbes et al.

(10) Patent No.: US 10,127,568 B2
(45) Date of Patent: Nov. 13, 2018

(54) SYSTEMS AND METHODS FOR IMPROVING THE ACCURACY OF DAY-AHEAD LOAD FORECASTS ON AN ELECTRIC UTILITY GRID

(75) Inventors: Kevin F. Forbes, Silver Spring, MD (US); Ernest M. Zampelli, Ellicott City, MD (US); O. Chris S. St. Cyr, Greenbelt, MD (US)

(73) Assignee: THE CATHOLIC UNIVERSITY OF AMERICA, Washington, DC (US)

( * ) Notice: Subject to any disclaimer, the term of this patent is extended or adjusted under 35 U.S.C. 154(b) by 0 days.

(21) Appl. No.: 13/438,936

(22) Filed: Apr. 4, 2012

(65) Prior Publication Data

US 2013/0096983 A1 Apr. 18, 2013

Related U.S. Application Data

(60) Provisional application No. 61/471,502, filed on Apr. 4, 2011, provisional application No. 61/557,700, filed on Nov. 9, 2011.

(51) Int. Cl.
*G06Q 10/00* (2012.01)
*G06Q 30/02* (2012.01)
*G06Q 10/04* (2012.01)
*G06Q 50/06* (2012.01)

(52) U.S. Cl.
CPC ......... *G06Q 30/0202* (2013.01); *G06Q 10/04* (2013.01); *G06Q 50/06* (2013.01); *Y04S 10/54* (2013.01); *Y04S 50/14* (2013.01)

(58) Field of Classification Search
CPC .... G06Q 30/0202; G06Q 10/04; G06Q 50/06; Y04S 10/54; Y04S 50/14

USPC ................................................ 705/7.11–7.42
See application file for complete search history.

(56) References Cited

U.S. PATENT DOCUMENTS

| | | | | |
|---|---|---|---|---|
| 4,841,925 A | * | 6/1989 | Ward | 123/143 B |
| 5,974,403 A | * | 10/1999 | Takriti et al. | 705/412 |
| 6,032,125 A | * | 2/2000 | Ando | 705/7.31 |
| 6,673,479 B2 | * | 1/2004 | McArthur et al. | 429/513 |
| 7,141,321 B2 | * | 11/2006 | McArthur et al. | 429/443 |

(Continued)

OTHER PUBLICATIONS

Zareipour. Price Forecasting and Optimal Operation of Wholesale Customers in a Competitive Electricity Market. 2007. University of Waterloo (Canada). [retrieved from the internet on Jul. 3, 2012]. Retreived from ProQuest Dissertations and Theses: <http://search.proquest.com/docview/304716353?accountid=142944>. entire document.*

(Continued)

*Primary Examiner* — Jonathan G Sterrett
(74) *Attorney, Agent, or Firm* — Amster, Rothstein & Ebenstein LLP

(57) ABSTRACT

Systems and methods improve the forecast of electricity consumption, and/or refining such predictions. Predictions may be refined by accounting for factors such as preliminary predictions, pricing and cost information associated with future supply of energy, the extent of anticipated changes in the predictions, the time of day and/or anticipated daylight for the period of time. Coefficient values are calculated for a forecast error model that takes into account factors related to electricity consumption using existing historical electrical grid data. Using the calculated values, the forecast error model may be applied to current electricity demand forecasts.

23 Claims, 13 Drawing Sheets

(56) References Cited

U.S. PATENT DOCUMENTS

| | | |
|---|---|---|
| 8,583,470 B1* | 11/2013 | Fine et al. .................... 705/7.31 |
| 2003/0182250 A1* | 9/2003 | Shihidehpour et al. ........ 706/21 |
| 2004/0110044 A1* | 6/2004 | McArthur et al. .............. 429/13 |
| 2007/0156510 A1* | 7/2007 | Kim et al. ...................... 705/10 |
| 2008/0033786 A1* | 2/2008 | Boaz et al. ..................... 705/10 |
| 2009/0093916 A1* | 4/2009 | Parsonnet et al. ............ 700/286 |
| 2010/0100250 A1* | 4/2010 | Budhraja et al. ............. 700/291 |
| 2010/0169165 A1* | 7/2010 | Bateni et al. ................... 705/10 |
| 2010/0292856 A1* | 11/2010 | Fujita ........................... 700/291 |
| 2011/0153386 A1* | 6/2011 | Kim et al. .................... 705/7.31 |

OTHER PUBLICATIONS

Kevin F. Forbes and Ernest M. Zampell, Do Day-Ahead Electricity Prices Reflect Economic Fundamentals? Evidence from the California ISO, The Energy Journal, vol. 35, No. 3. Copyright 2014 by the IAEE, pp. 129-144.

* cited by examiner

SYSTEMS AND METHODS FOR IMPROVING THE ACCURACY OF DAY-AHEAD LOAD FORECASTS ON AN ELECTRIC UTILITY GRID

CROSS-REFERENCE TO RELATED APPLICATIONS

This application references and claims priority to U.S. Provisional Patent Application No. 61/471,502, filed Apr. 4, 2011, and references and claims priority to U.S. Provisional Patent Application No. 61/557,700, filed Nov. 9, 2011. The contents the above-identified applications are incorporated herein by reference in their entirety.

FIELD

The present invention relates to systems and methods for predicting load on an electric utility grid, improving the forecast of electricity consumption, and/or refining such predictions.

SUMMARY

The present invention relates to systems and methods for predicting load on an electric utility grid, improving the forecast of electricity consumption, and/or refining such predictions. Further, the present invention can be used to more efficiently utilize the generators that produce electricity. Utilizing the systems and methods disclosed herein, the present invention can, amongst other things, enhance environmental quality, contribute to energy efficiency/conservation, and/or contribute to reducing greenhouse gas emissions.

By way of example, a forecasted level of load that is greater than actual electricity demand can induce the system operator to reduce the output of previously scheduled generating units so as to match electricity supply with demand. This reduction in output can be expected to reduce the operating efficiency of the generating units in question, thereby increasing their emissions per megawatt-hour of generated electricity. On the other hand, a forecasted level of load that is less than actual electricity demand can induce the system operator to dispatch "peaking" units (e.g. a single cycle turbine) which can have a high degree of operational flexibility but are also high in terms of carbon intensity. Hence, the systems and methods disclosed that for predicting load on an electric utility grid, improving the forecast of electricity consumption, and/or refining such predictions can enhance environmental quality, contribute to energy efficiency/conservation, and/or contribute to reducing greenhouse gas emissions.

Traditionally, some have used forecasts of meteorological conditions to predict the load on electric utility grids. However, in embodiments of the present invention, the systems and methods refines initial predictions of load on electric utility grids to generate refined predictions using information comprising market conditions reflecting other participants in the market and/or other factors. In embodiments of the present invention, the refined predictions can take into account variables that reflect the information and insights of the electricity suppliers, the "complexity" of the expected demand conditions, the time of day and/or anticipated daylight for the period of time, to name just a few. Further, in embodiments of the present invention, the refined predictions can take into account one or more factors such as regional factors, geographical factors, pricing and/or cost information associated with future supply of energy, the extent of anticipated changes in initial predictions, the extent of the anticipated changes in pricing and/or cost information associated with future supply of energy, and the time of day and/or anticipated daylight for the period of time, to name just a few.

In embodiments of the present invention, the system and method can forecast electricity demand for an electricity control area taking into account expected meteorological conditions in addition to variables that reflect the information and insights of the electricity suppliers, the "complexity" of the expected demand conditions, the time of day and/or anticipated daylight for the period of time, to name just a few. Further, in embodiments of the present invention, the refined predictions can take into account one or more factors such as regional factors, geographical factors, pricing and/or cost information associated with future supply of energy, the extent of anticipated changes in initial predictions, the extent of the anticipated changes in pricing and/or cost information associated with future supply of energy, and the time of day and/or anticipated daylight for the period of time, to name just a few.

Further, the present system, in exemplary embodiments, in addition to meteorological data and/or predictions taking in to consideration meteorological data the present invention can take into consideration one or more of the following data: load predictions for future periods of time, predictions for future periods of sub periods of time, pricing information for the same period of time and/or sub period of time, fuel costs for the same period of time and/or sub period of time, data related to the cost of fuel, data related to the day ahead price information relative to various energy suppliers, the extent of anticipated changes in pricing and/or cost information associated with future supply of energy, the extent of the anticipated changes in future demand of energy, the month of the year, the day of the week, the hour of the day and/or anticipated daylight for the period of time, and/or any further combination and separation thereof, to name a few.

In exemplary embodiments, the prediction can be for each hour of the next day. In exemplary embodiments, the prediction can be for each half hour of each day, fifteen minute segment, or any other sub period of times as may be consistent with the pricing and/or demand data, to name a few.

In exemplary embodiments, the predictions can take into account factors such as meteorological factors, pricing and/or cost information associated with future supply of energy, the extent of anticipated changes in the predictions, and the time of day and/or anticipated daylight for the period of time.

In exemplary embodiments, the present invention makes refinements in load predictions that were based on meteorological factors to adjust for systematic errors associated with those forecasts. In such embodiments, the refined prediction can take into account factors such as preliminary predictions, pricing and cost information associated with future supply of energy, the extent of anticipated changes in the predictions, the time of day and/or anticipated daylight for the period of time.

In exemplary embodiments, one or more computers associated with an electric grids may receive forecast load levels for the grid. The computers may receive electrical grid information, such as, for example, a day-ahead profile of a forecasted load for the electric grid, a day-ahead sparks ratio, a day-ahead price profile, and an hourly forecasted load relative to the forecasted profile. The computers may access electronic databases with historical electrical grid information. The one or more computer may rely on the historical electrical grid information in order to perform regression analysis with respect to a forecast error equation. In exemplary embodiments, a forecast error equation may be a function of day-ahead sparks ratios, day-ahead price profiles, day-ahead profiles of forecasted load, and forecasted loads relative to the forecasted profiles. The one or more computers may use the historical information in order to calculate a set of coefficients for a forecast error equation based on the regression analysis. The one or more computers may calculate forecast prediction errors by applying the forecast error equation with the calculated set of coefficients to the obtained electrical grid information. The one or more computers may generate one or more electronic reports containing revised forecast errors and revised forecast predictions for the electric grid. The electronic reports may be used to adjust the load of the grid accordingly.

In some exemplary embodiments, the forecast error equation may be further refined. After calculating a set of coefficients, differences between predicted errors from the historical data using the forecast error equation, and actual errors from the historical data can be calculated. These residual terms may be applied to an auto-regressive moving average analysis, in order to determine disturbances at one or more times. The one or more computers may calculate a new set of coefficients for the forecast error equation based on the auto-regressive moving average analysis.

In exemplary embodiments, the forecast error equation may be a multivariable fractional polynomial model.

In exemplary embodiments a forecast error equation may include: a Coefficient of Variation variable calculated over a day as the ratio of standard deviation of the day-ahead prices to the average hourly price; a Positive Skewness variable calculated over a day, as values equal to the absolute value of the skewness in the day ahead prices; a Negative Skewness variable calculated over a day, as values equal to the absolute value of the skewness in the day ahead prices; a Forecasted Load Peak Ratio variable calculated over a day, as the ratio of the forecasted load to the forecasted peak load; a Forecasted Load Nadir Ratio variable calculated over a day, as the ratio of the forecasted load to the forecasted minimum load; a Forecasted Load Peak variable equal to values of the forecasted peak hourly load for a day; a Forecasted Load Nadir variable equal to values of the forecasted minimum hourly load for a day; a Coefficient of Variation of Forecasted Load Variable calculated over a day, as the ratio of standard deviation of the day prices to the average hourly price; a Positive Skewness Forecasted Load Variable calculated, using one or more computers, as equal to the skewness in the day-ahead forecasted hourly load when the skewness is positive; a Negative Skewness Forecasted Load variable calculated, as equal the absolute skewness in the day-ahead forecasted hourly load when the skewness is negative; a Forecasted Delta Load variable calculated over a day, as equal to the forecasted load in the current time period relative to the forecasted load in the previous time period; a Geo Sigma Forecasted Load variable calculated over a day, as the geometric standard deviation of the Forecasted Delta Load variable; a Peak Sparks Ratio variable equal to the ratio of the highest day-ahead price of electricity relative to the price of a fuel used to generate electricity; an Average Peak Forecasted Load variable calculated as, as the average value of the forecasted load for the day relative to the peak level of the forecasted load for the day, a day-ahead hourly volume of energy traded variable, a mean daily volume of energy traded variable, coefficient of variation in the daily volume of energy traded variable, and a skewness in the volume of energy traded variable.

In exemplary embodiments, the sparks ratio is the day-ahead electricity prices relative to the prices of the fuel used to generate electricity. In some exemplary embodiments, the fuel may be natural gas, coal, and/or oil.

BRIEF DESCRIPTION OF THE DRAWINGS

The features and advantages of the present invention will be more fully understood with reference to the following, detailed description when taken in conjunction with the accompanying figures, wherein.

DETAILED DESCRIPTION

The present invention relates to systems and methods for predicting load on an electric utility grid, improving the forecast of electricity consumption, and/or refining such predictions.

Further, in exemplary embodiments, the present invention can be used to more efficiently utilize the fleet of generation resources. Utilizing the systems and methods disclosed herein, the present invention can, amongst other things, enhance environmental quality, contribute to energy efficiency/conservation, and/or contribute to reducing greenhouse gas emissions.

By way of example, a forecasted level of load that is greater than actual electricity demand can induce the system operator to reduce the output of previously scheduled generating units so as to match electricity supply with demand. This reduction in output can be expected to reduce the operating efficiency of the generating units in question, thereby increasing their emissions per megawatt-hour of generated electricity. On the other hand, a forecasted level of load that is less than actual electricity demand can induce the system operator to dispatch "peaking" units (e.g. a single cycle turbine) which can have a high degree of operational flexibility but are also high in terms of carbon intensity. Hence, the systems and methods disclosed that for predicting anticipated load demand on an electric utility grid, load on an electricity grid, improving the forecast of electricity consumption, and/or refining such predictions can enhance environmental quality, contribute to energy efficiency/conservation, and/or contribute to reducing greenhouse gas emissions.

Figure 1:
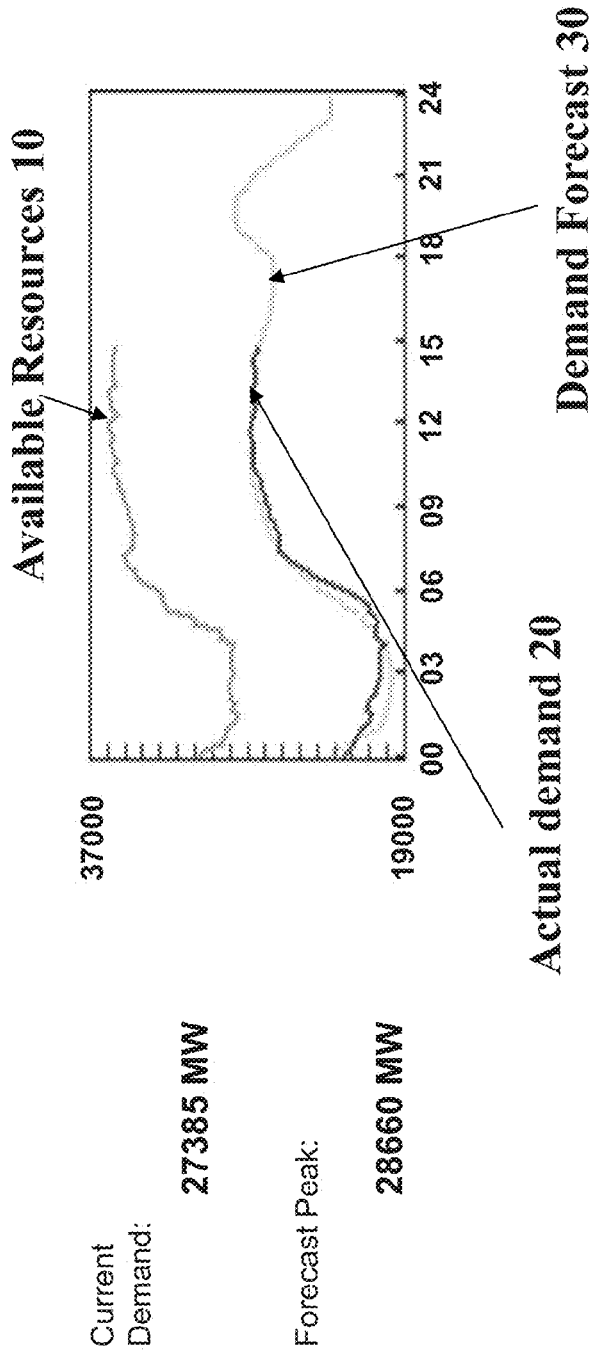
FIG. 1. illustrates an exemplary load graph as published by the California Independent System Operator (CAISO), including exemplary kinds of data that can be used with exemplary embodiments of the present invention.

Traditionally, some have used meteorological conditions to predict anticipated load demand on an electric utility grid, load on an electricity grid, improving the forecast of electricity consumption, and/or refining such predictions, as illustrated in FIG. 1. However, in embodiments of the present invention, the systems and methods takes the initial predictions for the anticipated load demand on electric utility grids to generate refined predictions using information comprising market conditions reflecting the insights and expectations of other market participants and/or other factors.

In embodiments of the present invention, the refined predictions can take into account one or more factors such as seasonal factors, geographical factors, day of the week considerations, hour of the day considerations, pricing and/or cost information associated with future supply of energy, the extent of anticipated changes in initial predictions, measures of the variation in expected demand over the course of the day, the extent of the anticipated changes in pricing and/or cost information associated with future supply of energy, and the time of day and/or anticipated daylight for the period of time, to name a few.

In embodiments of the present invention, the system and method can make predictions for the anticipated load demand on electric utility grids to generate by taking into account meteorological conditions in addition to one or more factors such as seasonal factors, geographical factors, day of the week considerations, pricing and/or cost information associated with future supply of energy, the extent of anticipated changes in initial predictions, measures of the variation in expected demand over the course of the day, the extent of the anticipated changes in pricing and/or cost information associated with future supply of energy, the extent of the anticipated changes in future demand of energy, and the time of day and/or anticipated daylight for the period of time, and/or any further combination and separation thereof, to name a few.

Further, the present systems and methods, in exemplary embodiments, in addition to meteorological data and/or predictions, take in to consideration meteorological data the present invention can take into consideration one or more of the following data: load predictions for future periods of time, load predictions for future periods of sub periods of time, pricing information for the same period of time and/or sub period of time, fuel costs for the same period of time and/or sub period of time, data related to the cost of fuel, data related to the day ahead price information relative to various energy suppliers, and/or any further combination and separation thereof, to name a few.

In exemplary embodiments, systems and methods disclosed herein are for use with, amongst other things, a wholesale energy output such as a wholesale electricity market system. Wholesale electricity market systems can exist when competing generators offer their electricity output to the system operator.

The wholesale electricity market system traditionally functions as a bid-based, security-constrained, economic dispatch with nodal prices-type systems wherein price in the day-ahead market can be determined by minimizing generating costs based on the bids from the generators, expected load, expected net imports from other control areas, expected demand response from consumers, and expected transmission constraints. The result is a classic supply and demand equilibrium price. This type of pricing can include an hourly interval and can be calculated separately for sub regions in which the system operator's load flow model indicates that constraints will bind transmission imports. Other time and/or region divisions may be used consistent with the scope and spirit of the present invention. For example, time divisions such as half hour, fifteen minute, or other time divisions which may be consistent with pricing and/or demand data, to name a few, can be used consistent with the scope and spirit of the present invention.

Further, referring to FIG. 1, including additional information shown, the theoretical prices of energy, demand forecast, at each node on the network can be calculated as a "shadow price", in which it is assumed that one additional kilowatt-hour is demanded at the node in question, and the hypothetical incremental cost to the system that would result from the optimized redispatch of available units, available resources 10, establishes the hypothetical production cost of the hypothetical kilowatt-hour wherein the difference between the actual demand 20 and demand forecast 30 represent the error in the demand forecast. In exemplary embodiments, the price may be known as a locational marginal price (LMP) or nodal price. In practice, the LMP algorithm described above can be run such that, incorporating a security-constrained, the least-cost dispatch calculation with supply based on the generators that submitted offers in the day-ahead market, and demand based on bids from load-serving entities can function such that supplies at the various nodes can be drained of energy.

Surprisingly, load prediction does not currently take into account variables that reflect the information and insights of the firms that supply electricity to the power grid. These firms have an economic interest in the market outcome and thus will base their day-ahead supply offers on their expectations of demand. The challenge for these firms is to submit a bid that more than recoups their variable costs of production that does not exceed the bid of the marginal generating unit. But the marginal generating unit is conditional on electricity demand and thus firms have very large incentives to correctly anticipate demand. To the extent that the market is efficient, the collective information and insights of the suppliers will be reflected in the market prices. The existing methods used by load forecasters are also deficient in capturing the seasonal influences, day of the week considerations, hour of the day considerations, daylight considerations, and the effect that the shape of both the price and expected demand over the course of the forecast day have on the forecast errors over that day.

Further, in exemplary embodiments, the prediction can be for each hour of the next day. In exemplary embodiments, the prediction can be for each half hour of each day, fifteen minute segment, or other sub period of times as may be consistent with the pricing and/or demand data, to name a few.

In exemplary embodiments, the predictions can take into account factors such as, but not limited to, meteorological factors, seasonal factors, geographical factors, day of the week considerations, hour of the day considerations, pricing and/or cost information associated with future supply of energy, the extent of anticipated changes in initial predictions, measures of the variation in expected demand over the course of the day, the extent of the anticipated changes in pricing and/or cost information associated with future supply of energy, and the time of day and/or anticipated daylight for the period of time, to name a few.

Further, in exemplary embodiments, the predictions can take into account factors such as, but not limited to, regional factors, geographical factors, pricing and/or cost information associated with future supply of energy, the extent of anticipated changes in the predictions, and the time of day and/or anticipated daylight for the period of time, to name a few.

In exemplary embodiments, the present invention uses an initial prediction taking into consideration meteorological factors to form a refined prediction which adjusts for systematic errors associated with the methodology used to generated the initial prediction and/or other information not otherwise taken into consideration in the initial prediction. In such embodiments, the refined prediction can take into account one or more factors such as preliminary predictions, pricing and cost information associated with future supply of energy, the extent of anticipated changes in the predictions over the course of the forecast day, the time of day and/or anticipated daylight for the period of time.

By way of example, in terms of supply costs, the price of energy in the California ISO can be highly dependent on the delivered price of natural gas and the heat rates of the marginal generating unit where the heat rate reflects the quantity of energy (e.g. natural gas measured in MMbtu) required to produce a megawatt of electricity. Further, when load is low, only the most efficient plants may be dispatched and thus prices may reflect the natural gas operating costs of these low heat rate units. When loads are high, less efficient generating units may be the marginal source of supply and the day-ahead market price of energy will reflect the operating costs of these higher heat rate units to the extent that the day-ahead energy market is, amongst other things, efficient. As a result there can be a positive relationship between the day-ahead energy/gas price ratio and load.

For ease, the day-ahead energy/gas price ratio is, at times, described as the "sparks ratio." This is merely for ease and is in no way meant to be a limitation.

In exemplary embodiments, the sparks ratio can be calculated under the assumption of substantially no energy losses and can, for example, increase as generating units with higher heat rates are expected to be dispatched. Following the above example, the relationship between this ratio and load for the PG&E LAP is illustratively depicted in FIG. 3, as discussed below.

In exemplary embodiments, the prediction can be for each hour of the next day. In exemplary embodiments, the prediction can be for each half hour of each day, fifteen minute segment, ten minute segment, other sub period of times as may be consistent with the pricing and/or demand data, to name a few.

In exemplary embodiments, the predictions can take into account factors such as meteorological factors, pricing and/or cost information associated with future supply of energy, the extent of anticipated changes in the predictions, and the time of day and/or anticipated daylight for the period of time.

In exemplary embodiments, the present invention refines an initial prediction taking into consideration meteorological factors to form a refined prediction which adjusts for systematic errors associated with the methodology used to generated the initial prediction and/or other information not otherwise taken into consideration in the initial prediction. In such embodiments, the refined prediction can take into account factors such as preliminary predictions, pricing and cost information associated with future supply of energy, the extent of anticipated changes in the predictions, the time of day and/or anticipated daylight for the period of time.

In exemplary embodiments, the "sparks ratio" can be calculated under the assumption of no energy losses. That is, that 1 MWh is approximately equivalent to 3.412 MMBTU. To facilitate the presentation of the data, the ratio in the figure can be reported for the range of one through ten. This range can account for over 98 percent of the observations.

Figure 2A:
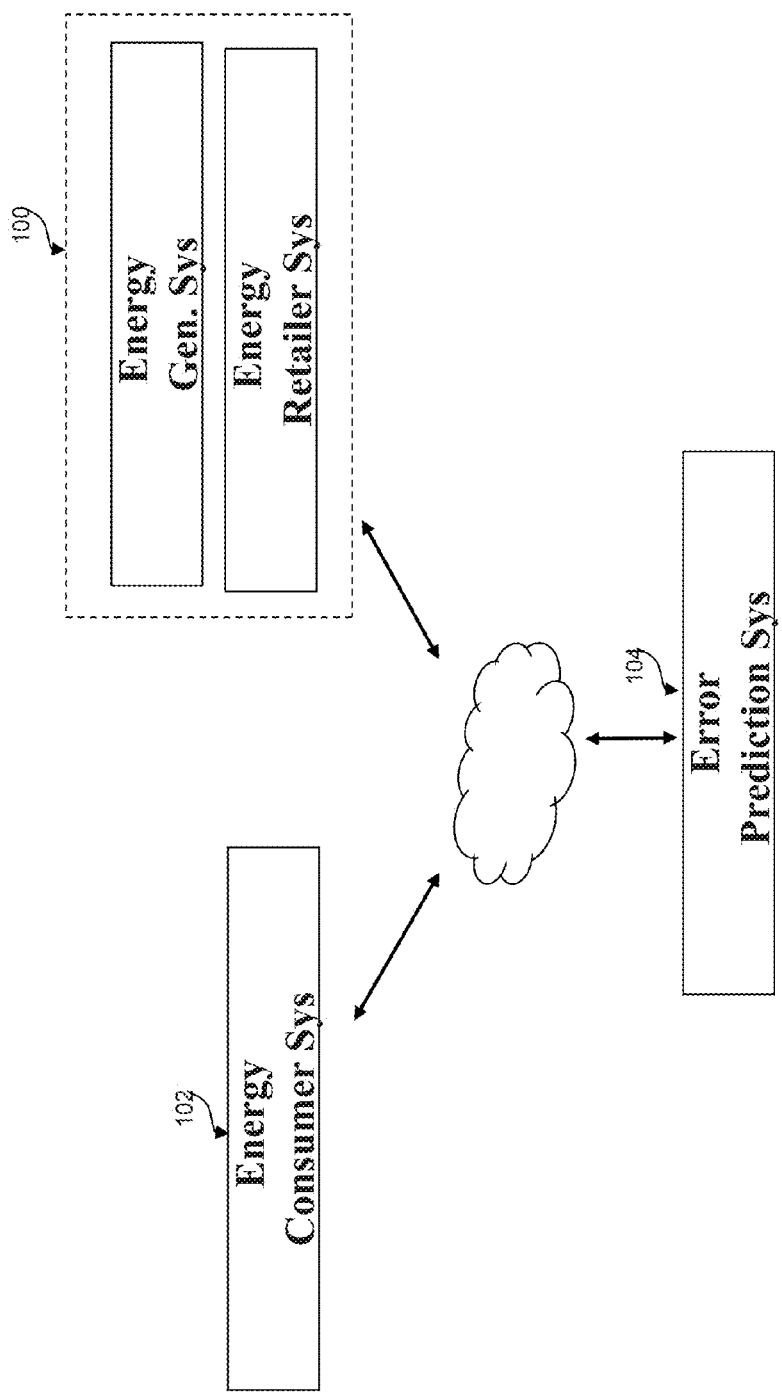
FIGS. 2A-2B are block diagrams of certain components of the systems and methods for predicting anticipated load demand on an electric utility grid, in accordance with exemplary embodiments of the present invention.
Figure 2B:
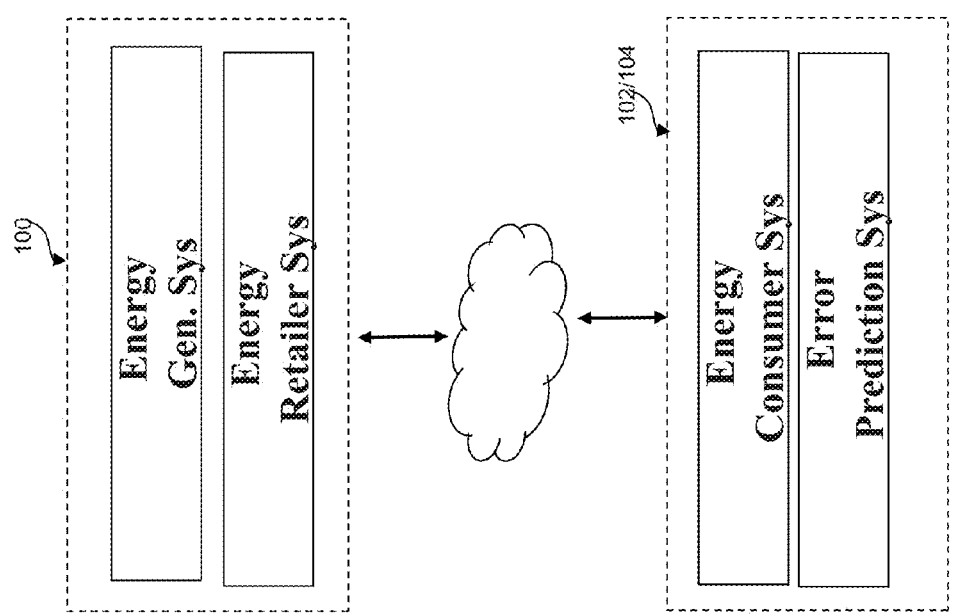

Referring to FIGS. 2A-2B, in exemplary embodiments, as described below, output consumers system 102 affiliated with a prediction error system 104 and/or a stand alone prediction error system 104 can determine the load forecasting error as a function of the day-ahead sparks ratio, the day-ahead price profile, the day-ahead profile of forecasted load, and the hourly forecasted load relative to the forecasted profile, to name a few. In exemplary embodiments, the day-ahead price profile can be measured by the coefficient of variation and skewness in the day-ahead prices. Further, in exemplary embodiments, the day-ahead load profile can be measured by the coefficient of variation and skewness in the day-ahead forecasted load, the forecasted peak load, and the forecasted minimum load. Further still, in exemplary embodiments, the hourly forecasted load relative to the forecasted load profile can be measured by the hourly forecasted load relative to both the peak and minimum forecasted levels of load.

In exemplary embodiments, output consumers system 102 affiliated with a prediction error system 104 and/or a stand alone prediction error system 104 can determine the load forecasting error as a function of binary variables for, for example, the hour of the day, the day of the week, the month of the year, and/or whether the hour in question occurs between sunrise and sunset, to name a few.

Figure 3:
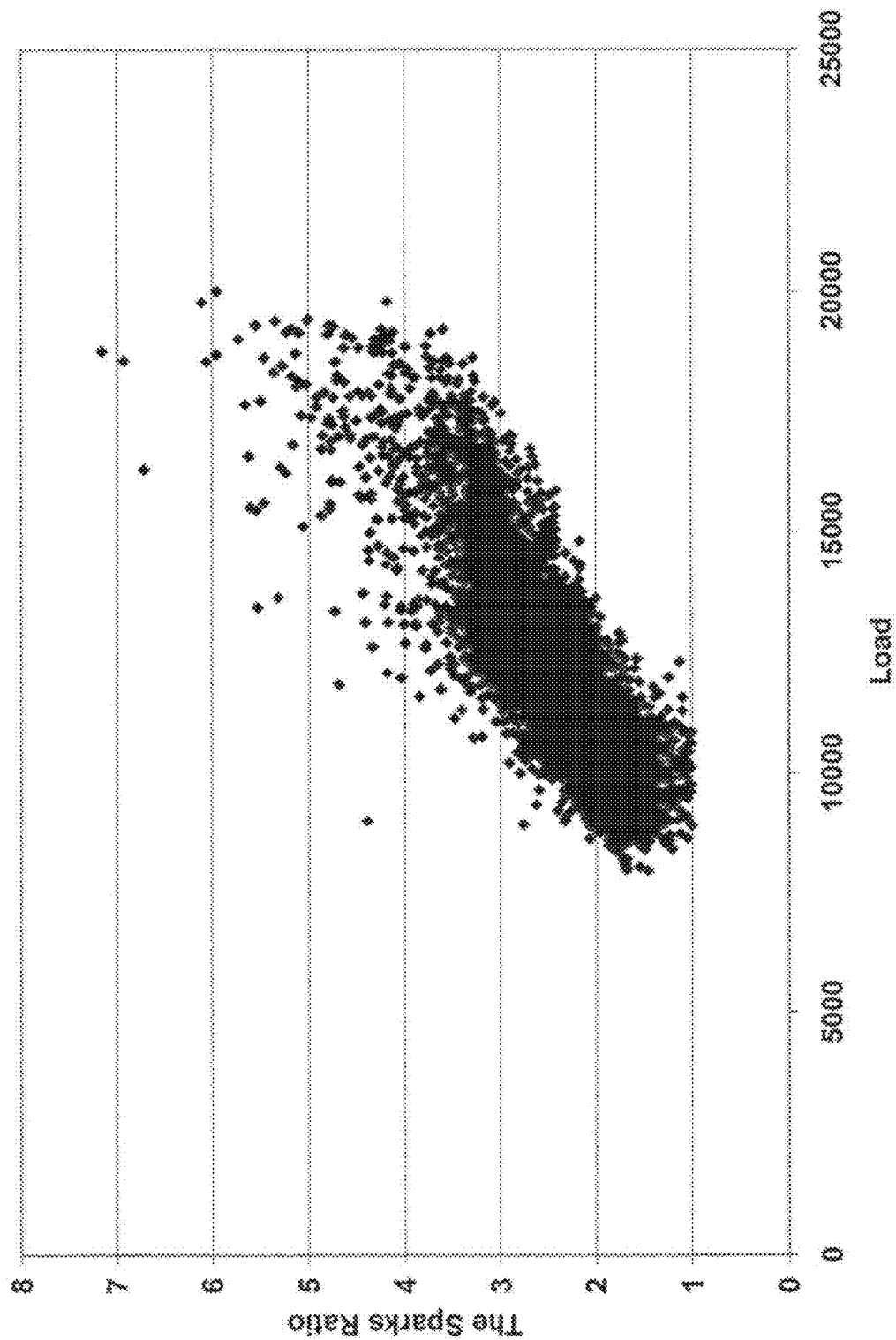
FIG. 3 is a scatter diagram illustrating an exemplary relationship between the day-ahead energy/natural gas price ratio ("sparks ratio") and load including data that can be used with exemplary embodiments of the present invention.

In exemplary embodiments, referring to FIG. 3, the marginal impact of each explanatory variable on the error measured in Mega Watts (MW) may not be independent of the values of the other explanatory variables. By way of example, as shown, a scatter diagram can have a positive slope indicating that the day-ahead sparks ratio is generally higher, the higher the level of actual load. Without meaning to be bound by theory, this can occur for various reasons. For example, generating units can be dispatched based on economics wherein the substantially more efficient units can be dispatched first thereby generating efficiency declines as load increases. Further, the day-ahead price can be determined based on the economics of the last generating unit that is expected to be dispatched. Also, generators can be expected to base their bids on their private knowledge and/or insights about the next day's electricity demand. This can be done to avoid submitting a bid that may be above the bid of the marginal generating unit where the marginal generating unit will vary based on demand conditions. For if it is, the generating unit may not be dispatched. Based on these considerations, in exemplary embodiments, the day-ahead price of electricity relative to the price of the fuel can be positively correlated with the actual load. In exemplary embodiments, the relationship may not be linear.

In exemplary embodiments, the marginal impact of an increase in sparks ratio on the error may not be independent from either the hour of the day and/or the forecasted peak hourly load. By way of example, a high sparks ratio at 5:00 PM, a time period usually associated with peak daily demand, may have more significant implications than the same value earlier in the day. Hence, a simple ordinary least squares model specification may not be appropriate. More specifically, a loglinear specification may be more appropriate in that it can permit the estimated marginal impact for each independent variable on the error to be contingent on the values of the other independent variables. In terms of the error itself, the natural logarithm of the actual load relative to the forecasted load would appear to be an appropriate representation in that it represents the relative gap between forecasted and actual load.

By way of a more specific example, the output consumers system 102 affiliated with a prediction error system 104 and/or a stand alone prediction error system 104 can determine the load forecasting error by using, amongst other things, the equation (1). By way of example, in embodiments the load forecasting error can be a function of the day-ahead sparks ratio, the day-ahead price profile, the day-ahead profile of forecasted load, and the hourly forecasted load relative to the forecasted profile. The day-ahead price profile can be measured by the coefficient of variation and skewness in the day-ahead prices. Further, the day-ahead load profile can be measured by coefficient of variation and skewness in the day-ahead forecasted load, the forecasted peak load, and the forecasted minimum load. The hourly forecasted load relative to the forecasted load profile can be measured by the hourly forecasted load relative to both the peak and minimum forecasted levels of load. Also, binary variables can be included to represent for the hour of the day, the day of the week, the month of the year, and whether the hour in question occurs between sunrise and sunset.

Figure 4:
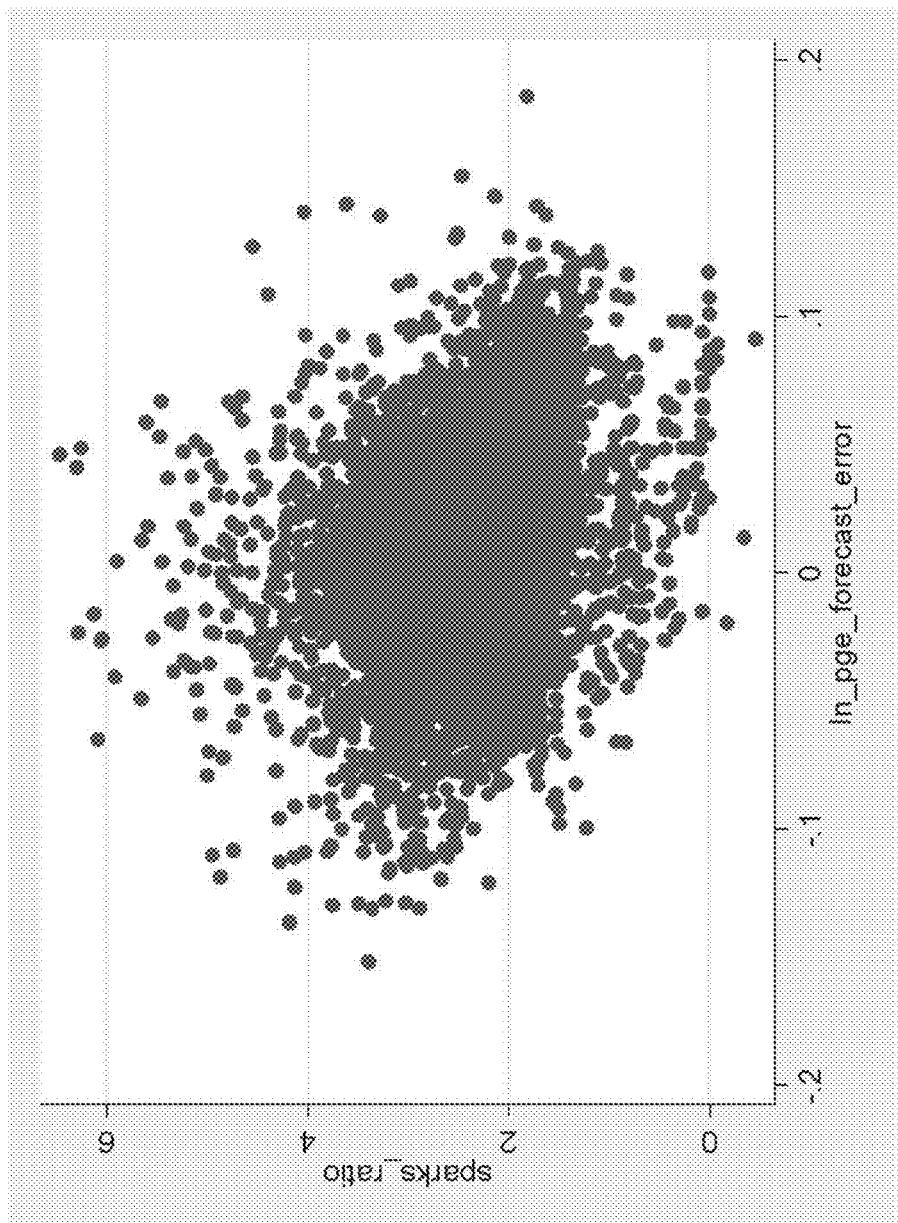
FIG. 4 is a scatter diagram illustrating an exemplary relationship between the day-ahead energy/gas price ratio ("sparks ratio") and a measure of the error by CASIO in forecasting load for Pacific Gas and Electric service territory, in accordance with exemplary embodiments of the present invention.

Illustrating the above, referring to FIG. 4, by way of another example, according to exemplary embodiments, the scatter diagram can have a negative slope indicating that the ratio of the actual to forecasted load tends to be higher the lower the day-ahead sparks ratio.

Figure 5:
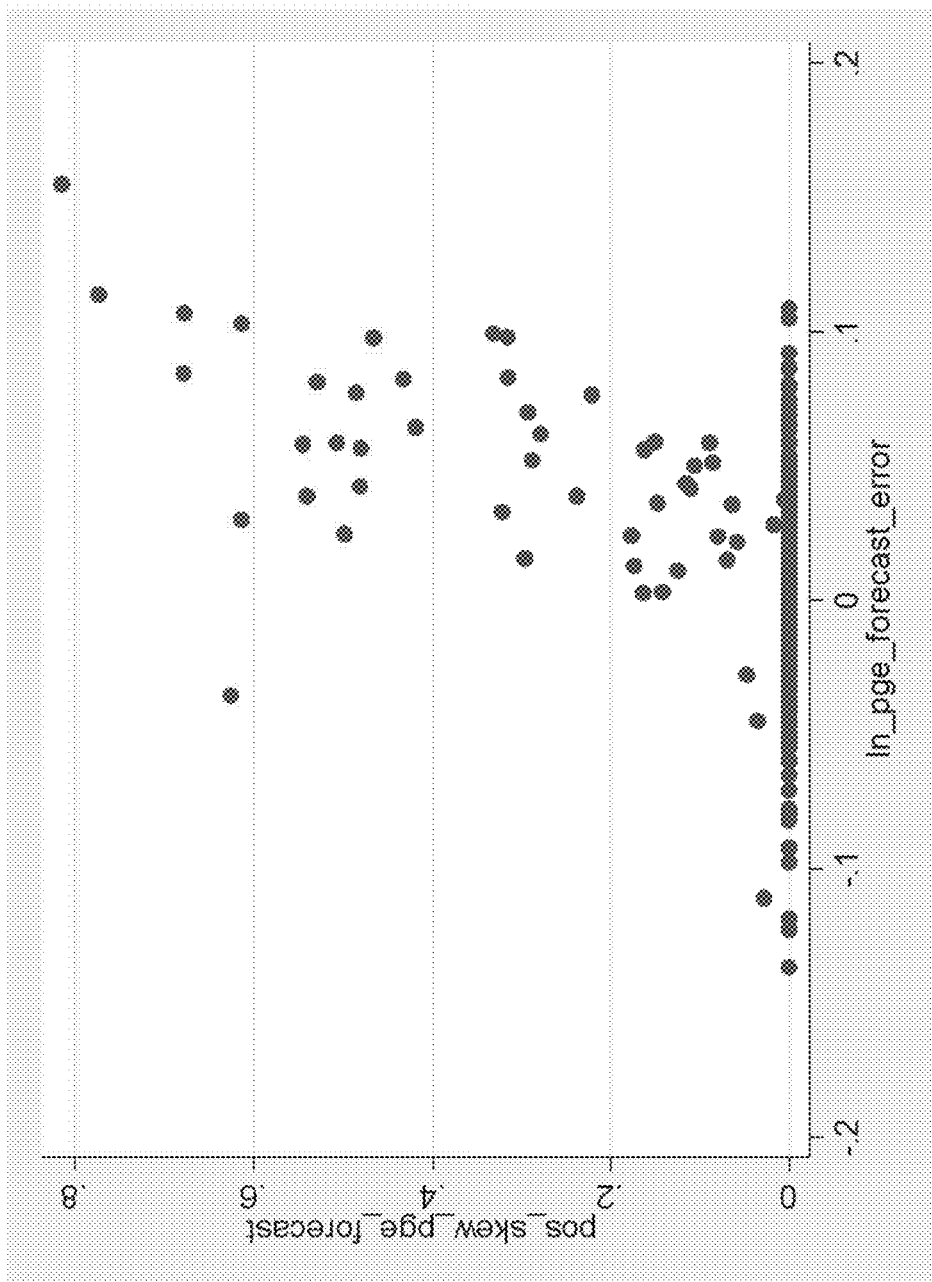
FIG. 5 is a scatter diagram illustrating an exemplary relationship between the skewness in the daily day-ahead forecast and a measure of the error by CASIO in forecasting the 5:00 PM load for Pacific Gas and Electric service territory, in accordance with exemplary embodiments of the present invention.

Further illustrating the above, referring to FIG. 5, by way of another example, according to exemplary embodiments, in the natural logarithm of the ratio of actual to forecast load at 5:00 PM can be positive if the daily forecast of load is, for example, positively skewed.

Equation (1):

$$\text{In ForecastError}_{hd} = f(\text{Hour}_j, \text{Day}_k, \text{Month}_i, \text{Daylight}_{hd}, \text{SparksRatio}_{hd}, \text{CVP}_d, \text{PosSkew}_{Pd}, \text{NegSkew}_{Pd}, \text{FLPeakRatio}_d, \text{FLNadirRatio}_d, \text{FLPeak}_d, \text{FLNadir}_d, \text{CVFL}_d, \text{PosSkewFL}_d, \text{NegSkewFL}_d) \quad (1)$$

where:

In ForecastError$_{hd}$ can be the natural logarithm of the ratio of actual to forecasted load for hour h in day d;

Hour$_j$ can be binary variables representing each hour of the day excluding hour one (j=2 to 24);

Day$_k$ can be binary variables representing each day of the week excluding Monday (k=2 to 7);

Month$_i$ can be binary variables representing each month excluding January (i=2 to 12);

Daylight$_{hd}$ can be a binary variable that can be equal to one if hour h in day d occurs between sunrise and sunset;

SparksRatio$_{hd}$ can be a measure of the day-ahead price of electricity relative to the price of natural gas, natural gas generating units playing an important role in establishing the market price of electricity. Increases in this ratio can be an indicator that more costly forms of generation are expected to be dispatched. By way of example, in the exemplary case of Pacific Gas and Electricity (PGE) LAP in California, the ratio can be measured as the day-ahead, for example, Apnode price for hour h in day d for the PG&E LAP divided by the price of natural gas reported by California ISO for the PG&E LAP the day prior to the closing of the day-ahead energy market. The Apnode price for the PGE LAP can be the locational marginal price for the PGE aggregated pricing node. Further, the price of natural gas can be normalized to its MWh equivalent under the assumption of zero energy losses. This can be done, for example, by multiplying the price per MMBtu by 3.412. For another example, this can be multiplied by a constant value that is greater than 3.412 which would imply a nonzero level of energy losses when the electricity is generated.

Figure 7:
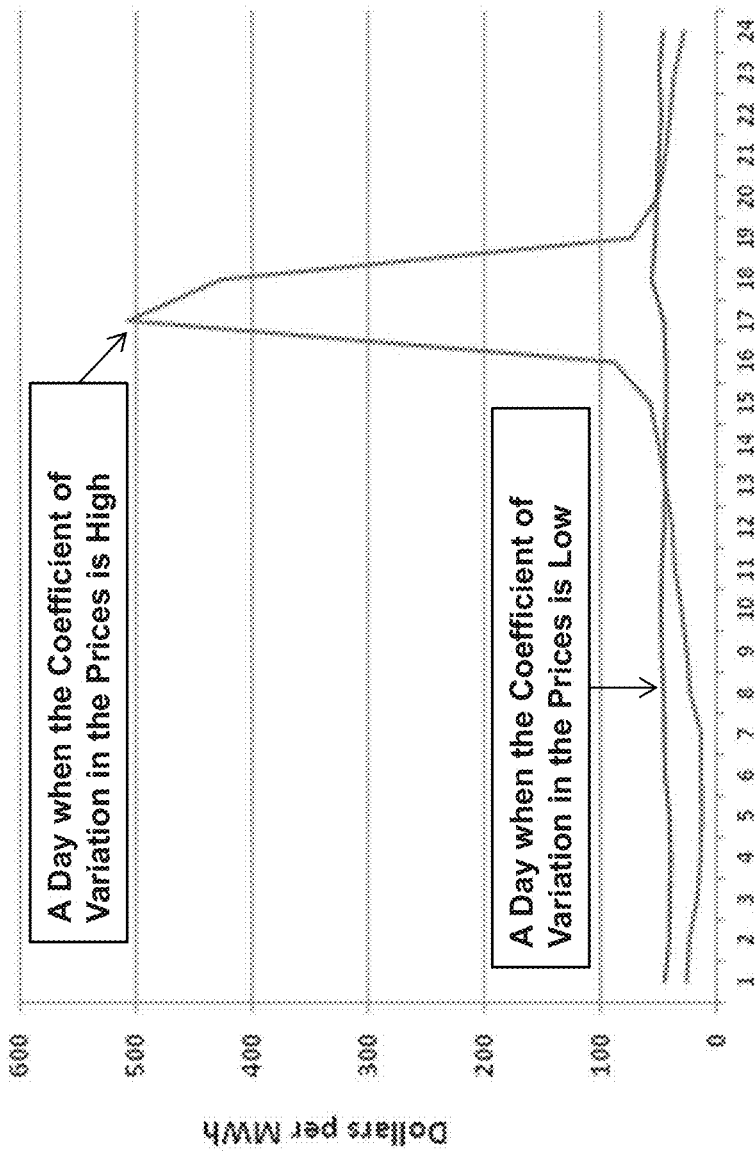
FIG. 7 is an illustrative depiction of graph depicting High vs. Low Variation in the Day-Ahead Price of Electricity, in accordance with exemplary embodiments of the present invention.

CVP$_d$ can be the coefficient of variation in the 24 hourly day-ahead prices in day d. Specifically, for each day both the average hourly price and the standard deviation in the prices can be calculated. The ratio of the latter to the former can be defined as CVP. This ratio can be a measure of the complexity of expected market outcomes over the forecast day. This is illustrated for two very different days on the California power grid, for example, referring to FIG. 7.

Figure 8:
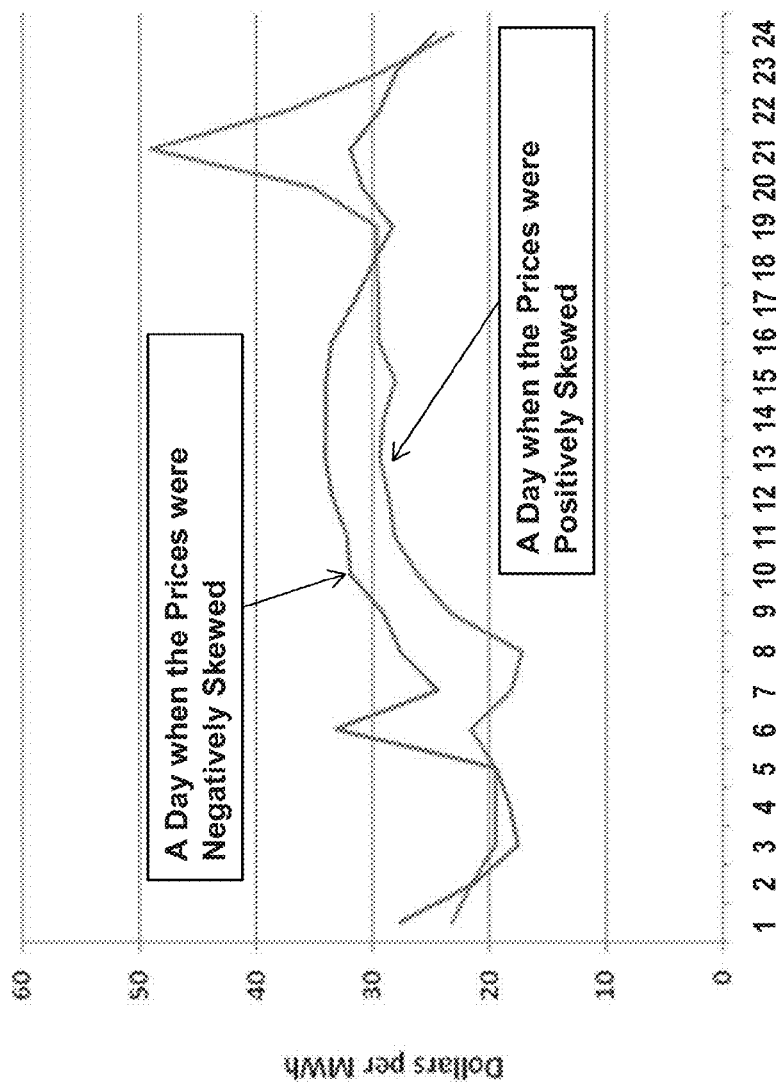
FIG. 8 is an illustrative depiction of graph depicting Positive vs. Negative Skewness in Day-Ahead Prices, in accordance with exemplary embodiments of the present invention.

PosSkew$_{Pd}$ can be substantially equal to, for example, the skewness in the 24 day-ahead hourly prices in day d when the skewness in the hourly prices can be positive. It can be equal to zero otherwise. The day-ahead prices can be positively skewed when there are a small number of hours which the day-ahead price is significantly higher as compared to other hours. This is illustrated for two different days in California, for example, referring to FIG. 8.

NegSkew$_{Pd}$ can be substantially equal to, for example, the absolute value of skewness in the 24 day-ahead hourly prices in day d when the skewness in the prices can be negative. It can be equal to zero otherwise.

FLPeakRatio$_{hd}$ can be substantially equal to, for example, the ratio of the forecasted load in hour h relative to the forecasted peak load in day d. This variable can represent the difference between forecasted load for the market period in question and the peak level of forecasted load over the course of the forecast day. This may be a key variable to the extent that forecasters focus on the accuracy of their peak load forecasts.

FLNadirRatio$_{hd}$ can be substantially equal to, for example, the ratio of the forecasted load in hour h relative to the forecasted minimum load level in day d. This variable can represent the difference between forecasted load for the market period in question and the minimum level of forecasted load over the course of the forecast day.

FLPeak$_d$ can be the forecasted peak hourly load in day d.

FLNadir$_d$ can be the forecasted minimum hourly load in day d.

Figure 9:
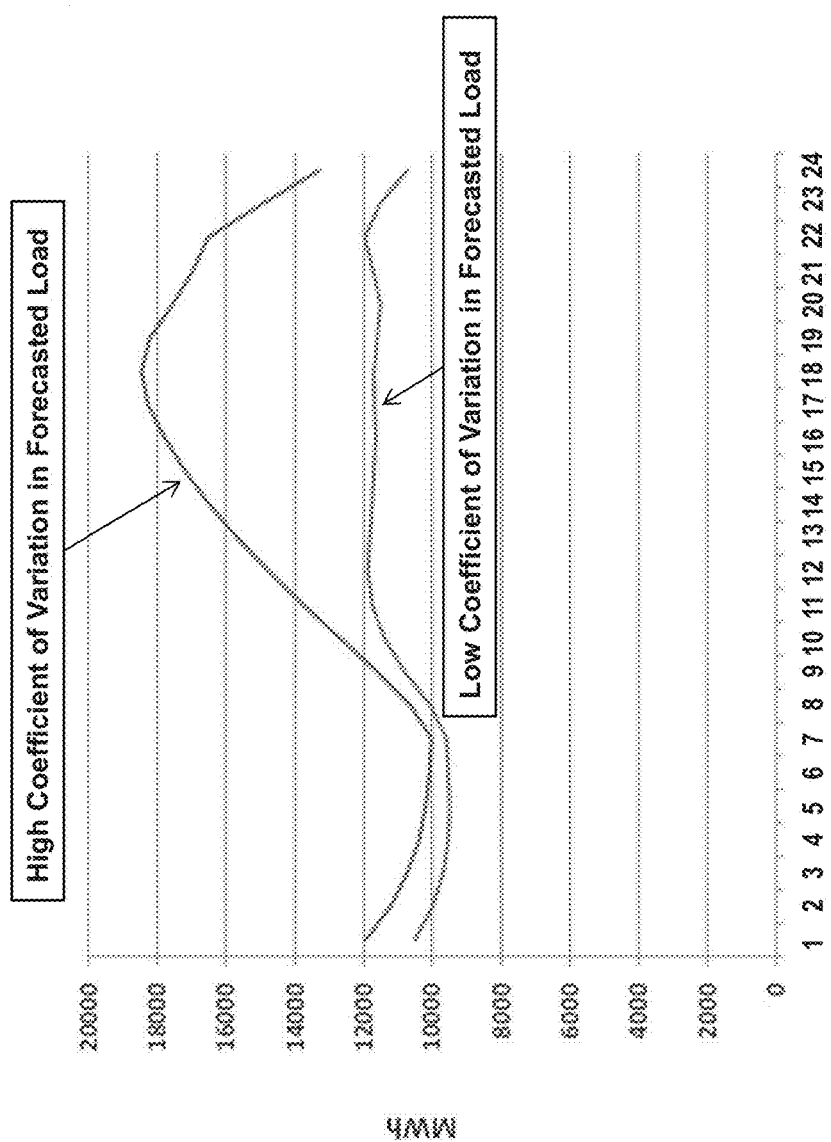
FIG. 9 is an illustrative depiction of graph depicting High vs. Low Variation in Forecasted Load, in accordance with exemplary embodiments of the present invention.

CVFL$_d$ can be the coefficient of variation in the 24 hourly day-ahead prices in day d. Specifically, for each day both the average hourly price and the standard deviation in the prices can be calculated. The ratio of the latter to the former can be defined as CVFLd. This can be a measure of the expected variation in electricity consumption over the forecast day. This variable can be illustrated for two very different forecast days in California, for example, referring to FIG. 9.

Figure 10:
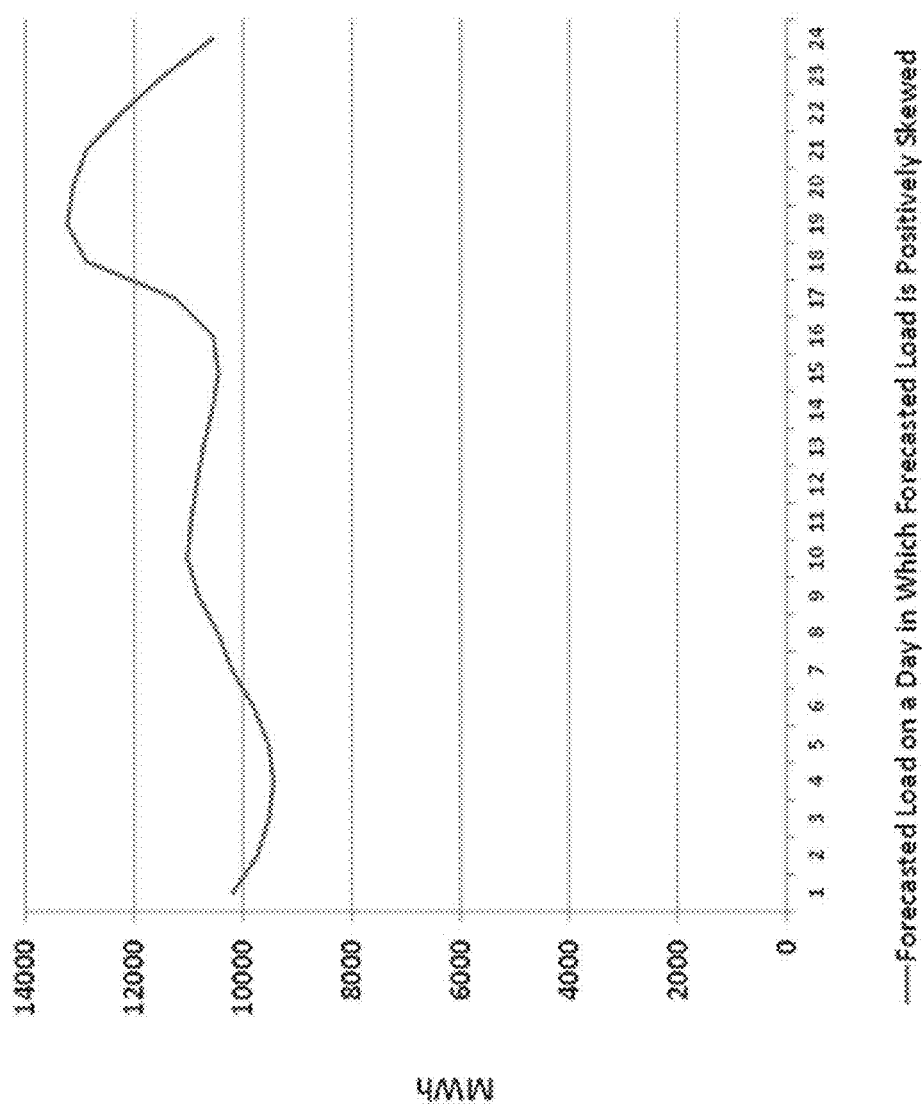
FIG. 10 is an illustrative depiction of graph depicting the pattern of forecasted load when forecasted load is positively skewed, in accordance with exemplary embodiments of the present invention.

PosSkewFL$_d$ can be substantially equal to, for example, the skewness in the 24 day-ahead hourly prices in day d when the skewness in the day-ahead forecasted hourly load can be positive. It can be equal to zero otherwise. Forecasted Load can be positively skewed when there are a small number of hours in which forecasted load is significantly higher than in other hours, for example, referring to FIG. 10.

NegSkewFL$_d$ can be a measure of whether forecasted load is negatively skewed. One measure of this can be the absolute value of the skewness in the 24 day-ahead hourly levels of forecasted load in day d when the skewness in the forecasted hourly load can be negative. It can be equal to zero otherwise.

In this example, formula 1 assumes an hourly time division h. Other time divisions may be used consistent with the scope and spirit of the present invention. For example, time divisions such as half hour, fifteen minute, ten minute, or other time divisions which may be consistent with pricing and/or demand data, to name a few, can be used consistent with the scope and spirit of the present invention. In such instances, h would be modified to reflect the alternative time division.

Following the above more specific example, the output consumers system 102 affiliated with a prediction error system 104 and/or a stand alone prediction error system 104 can determine the load forecasting error by using the following equation:

Equation (2)

$$\ln ForecastError_{hd} = const + \sum_{j=2}^{24} \alpha_j Hour_j + \sum_{k=2}^{7} \delta_k Day_k + \sum_{i=2}^{12} \mu_i Month_i + \beta_1 Daylight_{hd} + \beta_2 SparksRatio_{hd}^2 + \beta_3 CVP_d^{-1} + \beta_4 PosSkewP_d + \beta_5 NegSkewP_d + \beta_6 FLPeakRatio_d^{0.5} + \beta_7 FLNadirRatio_d^{0.5} + \beta_8 FLPeak_d + \beta_9 FLNadir_d + \beta_{10} CVFL_d^3 + \beta_{11} PosSkewFL_d + \beta_{12} NegSkewFL_d \quad (2)$$

The variables which are used in both Equation (1) and Equation (2) have the same meaning as set forth above. The symbols α, β, μ and β in equation (2) are estimated parameters that will vary from across electricity control areas. The values of the estimated parameters reflect the contribution of the corresponding variable to measure of the load forecast error.

In this example, formula 2 assumes an hourly time division h. Other time divisions may be used consistent with operations of the electricity control error. For example, time divisions such as half hour, fifteen minute, or other time divisions which may be consistent with pricing and/or demand data, to name a few, can be used consistent with the scope and spirit of the present invention. In such instances, h and the range for j would be modified to reflect the alternative time division.

Equation (2) was estimated for the PGE service territory in California using hourly data for the sample period 1 Apr. 2009 through 31 Mar. 2010. The results are presented in Table 1. Observe that the adjusted R-squared is approximately 0.48. This indicates that the model is able to "explain" approximately 48 percent of the error as measured by the natural logarithm of actual relative to forecasted load. It should also be noted that a substantial number of the coefficients are statistically significant as evidenced by their p values being less than 0.05.

TABLE 1

| Variable | Estimated Coefficient | t- Statistic | P value |
|---|---|---|---|
| const | 0.5576 | 12.99 | 0 |
| Hour$_2$ | 0.0075 | 5.98 | 0 |
| Hour$_3$ | 0.0171 | 10.25 | 0 |
| Hour$_4$ | 0.0242 | 13.14 | 0 |
| Hour$_5$ | 0.0312 | 16.9 | 0 |
| Hour$_6$ | 0.0446 | 25.31 | 0 |
| Hour$_7$ | 0.0590 | 29.72 | 0 |
| Hour$_8$ | 0.0516 | 19.31 | 0 |
| Hour$_9$ | 0.0517 | 14.73 | 0 |
| Hour$_{10}$ | 0.0521 | 13.47 | 0 |
| Hour$_{11}$ | 0.0506 | 12.34 | 0 |
| Hour$_{12}$ | 0.0452 | 10.75 | 0 |
| Hour$_{13}$ | 0.0472 | 11.23 | 0 |
| Hour$_{14}$ | 0.0463 | 10.91 | 0 |
| Hour$_{15}$ | 0.0443 | 10.51 | 0 |
| Hour$_{16}$ | 0.0449 | 10.69 | 0 |
| Hour$_{17}$ | 0.0541 | 12.18 | 0 |
| Hour$_{18}$ | 0.0577 | 12.5 | 0 |
| Hour$_{19}$ | 0.0517 | 11.52 | 0 |
| Hour$_{20}$ | 0.0515 | 11.9 | 0 |
| Hour$_{21}$ | 0.0425 | 10.57 | 0 |
| Hour$_{22}$ | 0.0153 | 4.66 | 0 |
| Hour$_{23}$ | −0.0049 | −2.04 | 0.042 |
| Hour$_{24}$ | −0.0100 | −6.51 | 0 |
| Tuesday (d = 2) | −0.0041 | −0.89 | 0.374 |
| Wednesday (d = 3) | −0.0001 | −0.02 | 0.987 |
| Thursday (d = 4) | 0.0047 | 1.02 | 0.307 |
| Friday (d = 5) | 0.0047 | 1.05 | 0.293 |
| Saturday (d = 6) | 0.0073 | 1.63 | 0.102 |
| Sunday (d = 7) | 0.0016 | 0.46 | 0.645 |
| February (i = 2) | −0.0019 | −0.58 | 0.561 |
| March (i = 3) | −0.0063 | −1.86 | 0.062 |
| April (i = 4) | −0.0144 | −3.6 | 0 |
| May (i = 5) | −0.0085 | −2.03 | 0.042 |
| June (i = 6) | −0.0135 | −2.62 | 0.009 |
| July (i = 7) | 0.0032 | 0.53 | 0.596 |
| August (i = 8) | 0.0028 | 0.51 | 0.613 |
| September (i = 9) | −0.0090 | −1.75 | 0.08 |
| October (i = 10) | −0.0033 | −0.89 | 0.374 |
| November (i = 11) | −0.0049 | −1.64 | 0.101 |
| December (i = 12) | 0.0015 | 0.43 | 0.665 |
| Daylight$_{hd}$ | 0.0044 | 2.69 | 0.007 |
| SparksRatio$_{hd}^2$ | 0.0016 | 5.24 | 0 |
| CVP$_d^{-1}$ | −0.0013 | −2.56 | 0.011 |
| PosSkewP$_d$ | 0.0051 | 2.67 | 0.008 |
| NegSkewP$_d$ | 0.0003 | 0.1 | 0.921 |
| PLPeakRatio$_d^{.5}$ | −1.2149 | −6.27 | 0 |
| PLNadirRatio$_d^{.5}$ | 0.6110 | 4.07 | 0 |
| PLPeak$_d$ | 0.0000 | −5.65 | 0 |
| PLNadir$_d$ | 0.0000 | 3.75 | 0 |
| CVPL$_d^3$ | 11.9449 | 4.01 | 0 |
| PosSkewPL$_d$ | −0.0047 | −0.51 | 0.613 |
| NegSkewPL$_d$ | 0.0044 | 0.75 | 0.456 |
| Adjusted R$^2$ | 0.4814 | | |
| Number of Observations | 8585 | | |

The parameter estimates presented in Table 1 can permit the calculation of a revised forecast. This can be done by first calculating the predicted value of the error variable based on the observed values of the Sparks Ratio and the other variables on the right hand sign of equation (2). The revised forecast can be obtained by taking the antilog of the predicted values and multiplying the resulting value by the level of load forecasted by the system operator.

Figure 6:
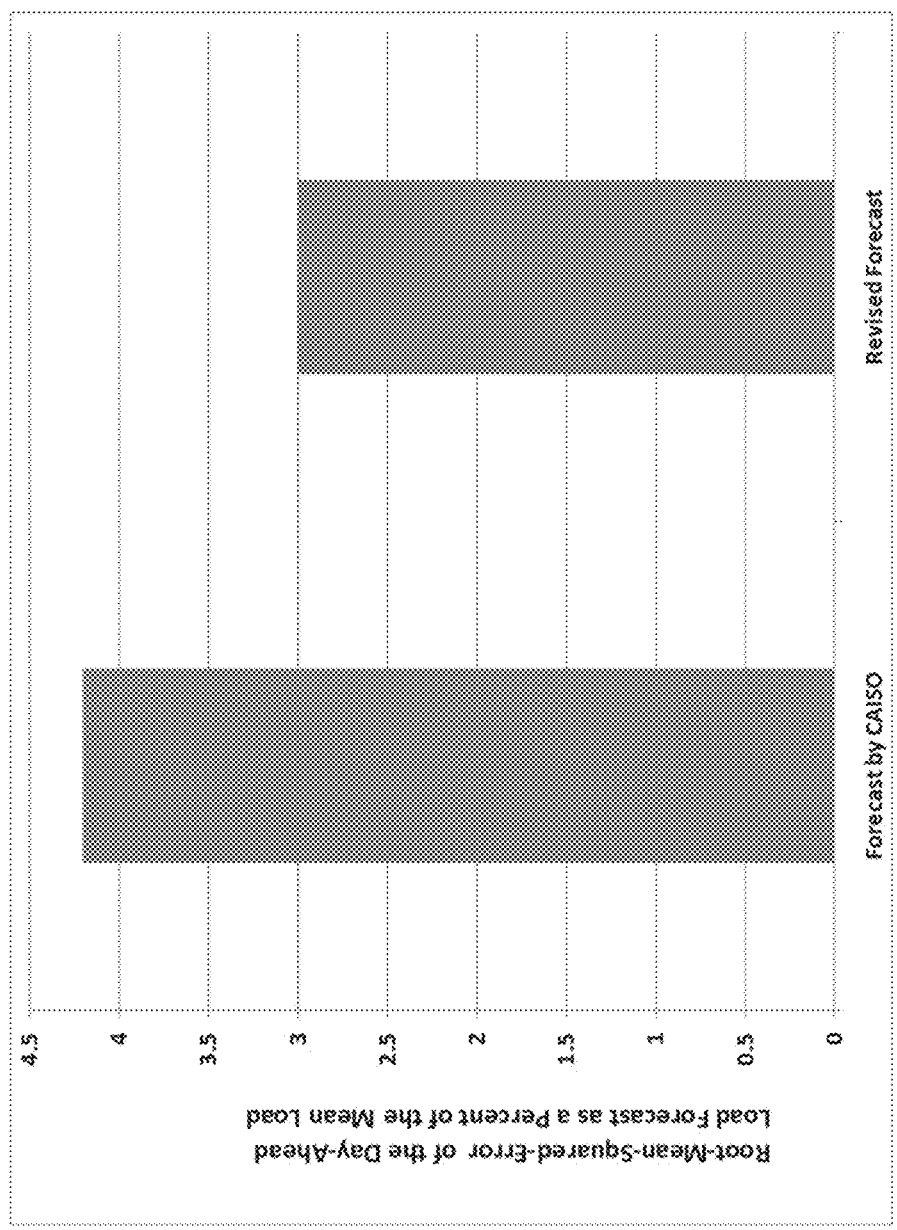
FIG. 6 is an illustrative depiction of a report depicting the results of an out-of-sample test of the methodology for the PGE service territory in California over the period 1 Apr. 2010 through 31 Dec. 2010, in accordance with exemplary embodiments of the present invention.

Referring to FIG. 6, by way of example, an illustrative depiction of a report is shown depicting the results of an exemplary out-of-sample test of the methodology disclosed herein for the PGE service territory in California over the period 1 Apr. 2010 through 31 Dec. 2010. Over this period, CASISO's day-ahead forecasts had a root-mean-squared-error of approximately 4.2 percent of mean load. Using the methodology presented above, the root-mean-squared-error of the revised forecasts is about 3 percent of mean load.

In exemplary embodiments, the model implemented in Equation (2) can be estimated using a multivariable fractional polynomial (MFP) model. In other embodiments, other functional forms where the variables/factors have different exponent values may be determined. In some embodiments, other functional forms may include one or more variables/factors used more than once with different exponents.

As an example, Equation 3 illustrates the results of an exemplary model where factors such as Positive Skewness in the Forcasted Load, and Negative Skewness in the Forecasted Load are each represented twice in the equation as separate variables with different exponents. Though Equation 3 shows each variable assigned an whole number exponent such as +1, −1, +2, etc., other non-integer exponents can be assigned to one or more variables, including for example fractions and decimals.

Equation (3)

$$\ln ForecastError_{hd} = \\ const + \sum_{j=2}^{24} \alpha_j Hour_j + \sum_{k=2}^{7} \delta_k Day_k + \sum_{i=2}^{12} \mu_i Month_i + \\ \beta_1 Daylight_{hd} + \beta_2 SparksRatio_{hd}^2 + \beta_3 CVP_d^{-1} + \beta_4 PosSkewP_d + \\ \beta_5 NegSkewP_d + \beta_6 FLPeakRatio_d + \beta_7 FLNadirRatio_d + \\ \beta_8 FLPeak_d^3 + \beta_9 FLNadir_d + \beta_{10} CVFL_d^3 + \beta_{11} PosSkewFL_d^{-2} + \\ \beta_{12} NegSkewFL_d^{-2} + \beta_{13} PosSkewFL_d^{-1} + \beta_{14} NegSkewFL_d^{-1}$$

(3)

In exemplary embodiments, the functional form of Equation 3 is used to calculate a new set of coefficients ($\beta_1$, $\beta_2$, etc.) each which is assigned to a variable, using the sampled data from for the PGE service territory in California using hourly data for the sample period 1 Apr. 2009 through 31 Mar. 2010.

In exemplary embodiments, a regression equation, like Equation 3, may be analyzed, for example using such techniques as autocorrelation to determine any systematic errors. For example, the residual, or the difference between a predicted load from a model, such as may be predicted using Equation 3, and the actual load, may be calculated. The residual may be further analyzed by calculating the autocorrelation of the residual.

Figure 11:
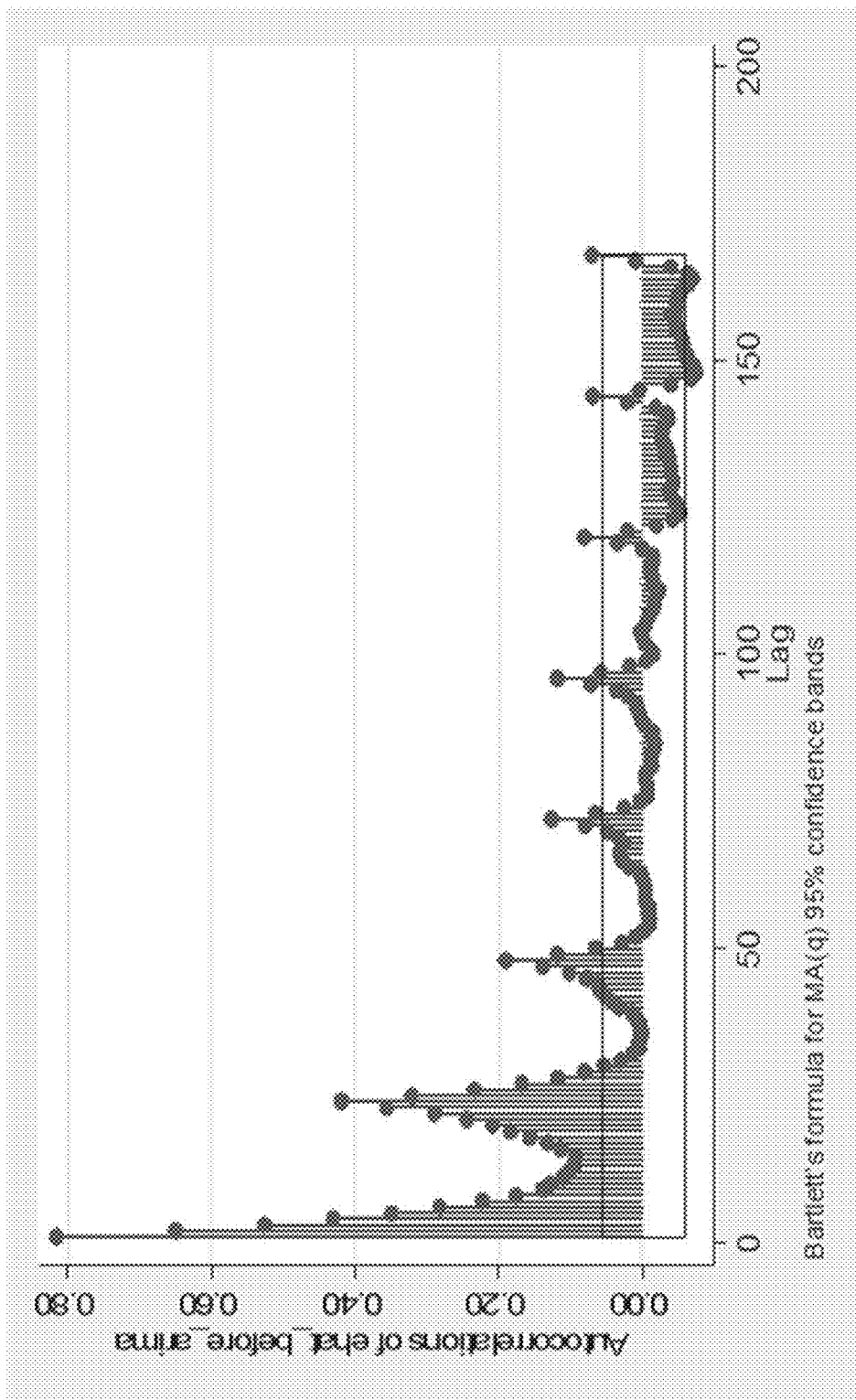
FIG. 11 is an illustrative depiction of graph depicting an autocorrelation of a residual of forecasted load pattern, in accordance with exemplary embodiments of the present invention.

For example, using Equation 3 and the coefficients from the sampled data, an autocorrelation of the residual can be calculated, the results of which are shown in FIG. 11. FIG. 11 shows when the autocorrelation of the residual is plotted over time, a "hidden" pattern is revealed. In this case, the plot shows the residual being correlated, specifically shown with a repeated series of peaks and valleys. The peaks and valleys may correlate with hourly, daily, weekly, etc. energy trends of power utilization trends of users.

Generally, in embodiments, a regression analysis can be further applied to reduce the range of the residual to appear substantially as random or "white noise". For example, in FIG. 11, the boxed area represents an area representing the range in which the residual should be substantially contained within, thus reducing the effect of a systematic error.

By way of example, in exemplary embodiments, a postulated equation, such as the Forecast Error equation set forth as Equation 3, may be modified to better fit the data and reduce or eliminate the effect of systematic error, such as illustrated in FIG. 11. For example, in exemplary embodiments, the error terms or the residual from an equation may be subjected to an autoregressive-moving-average (ARMA) analysis to refine the original equation to reduce or eliminate systematic errors. In an ARMA model the disturbances (i.e., the differences between the predicted and actual value of the one or more dependent variables) have a linear autoregressive moving-average (ARMA) specification over the period in which the model is estimated. In the simple case of an ARMA (1,1) model, the residual error term in period t, $u_t$, depends on the residual term in the previous period t−1, $u_{t-1}$, a measure of the "pure" error in period t, $\varepsilon_t$, and a weighted measure of the pure error term in period t−1, $\beta_1 * \varepsilon_{t-1}$, where $\beta_1$ is an estimated parameter. These calculations can be programmed to be performed by a computer.

Figure 12:
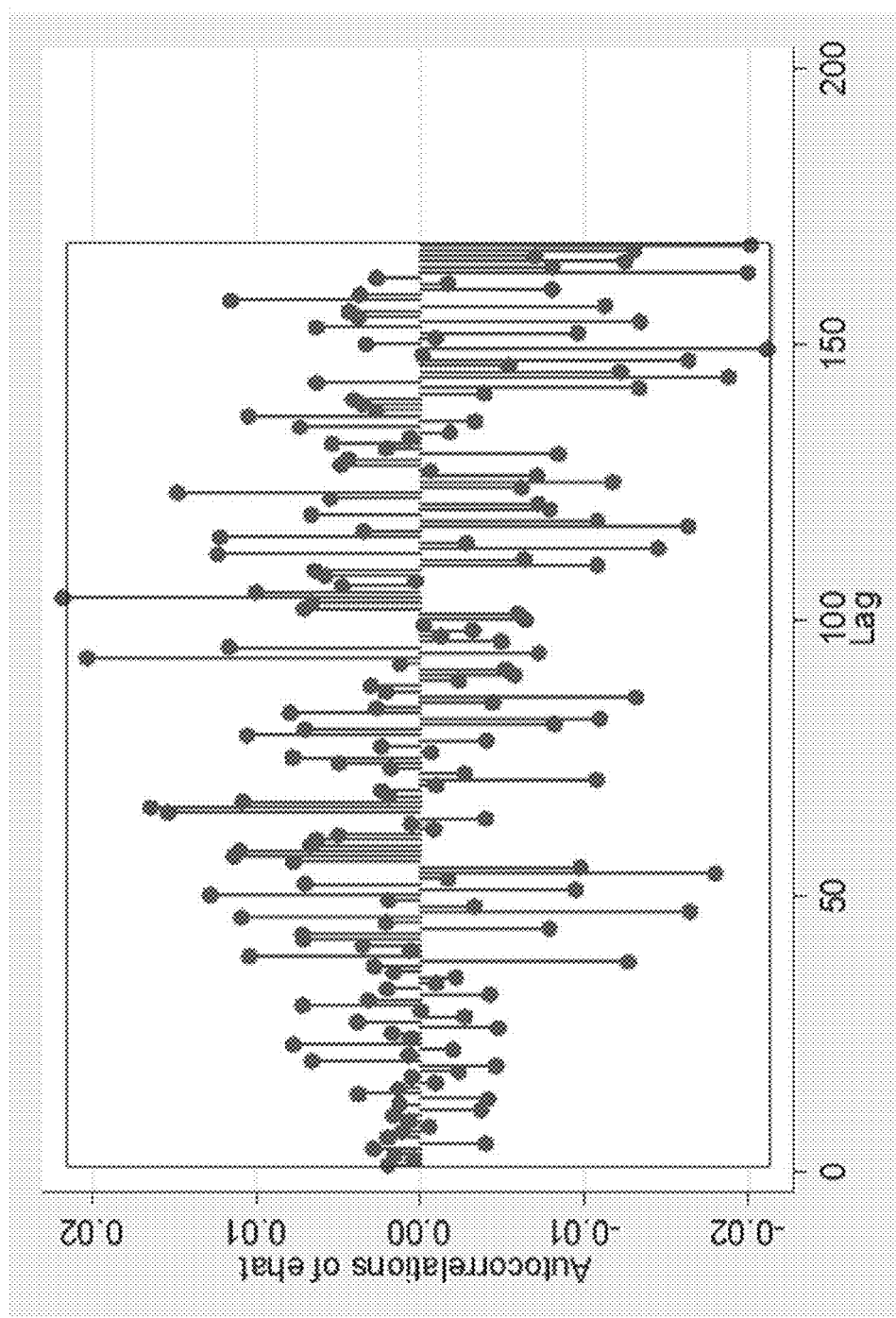
FIG. 12 is an illustrative depiction of graph depicting an autocorrelation of a residual of forecasted load pattern, in accordance with exemplary embodiments of the present invention.

In embodiments, an ARMA analysis applied to an equation may be used to refine that equation to reduce or eliminate systematic errors. For example, applying an ARMA analysis or procedure to the updated regression equation, disturbances from the regression equation may be modeled. Regarding the updated regression equation, the periods/hours times where disturbances affect the regression equation are found to be, using an autoregressive analysis, are 1, 2, 3, 4, 24, 48, 72, 96, 120, 144, 168, and 192. Using a moving average analysis, the disturbances are found to be located at periods/hours 1 through 36, 48, 65, 72, 96, 120, 144, 168, and 192. Applying the ARMA procedure, a new regression equation with new coefficients for one or more of the variables/factors of the updated regression equation can be calculated. FIG. 12 illustrates, an embodiment, where a new updated plot of the autocorrelation of the residual of the updated regression equation after applying the ARMA procedure. In contrast to FIG. 11, in this exemplary embodiment, the residual autocorrelation here is almost fully located within the boxed area, or within an acceptable error range.

In exemplary embodiments, the output consumers system 102 affiliated with a prediction error system 104 and/or a stand alone prediction error system 104 may determine the load forecasting error by using, amongst other things, equation (4):

$$\ln ForecastError_{hd} = f(Hour_i, Day_k, Month_l, Daylight_{hd}, \\ SparksRatio_{hd}, CVP_d, PosSkewP_d, NegSkewP_d, \\ FLPeakRatio_d, FLNadirRatio_d, FLPeak_d, FL\text{-} \\ Nadir_d, CVFL_d, PosSkewFL_d, NegSkewFL_d, \\ FDeltaL_{hd}, GSigmaFL_{hd}, PeakSparksRatio_{hd}, \\ AvPeakFL_d)$$

(4)

where:

$FDeltaL_{hd}$ (Forecasted_Delta_Load) can be substantially equal to, for example, the ratio of the forecasted load in hour h, day d, to the forecasted load in hour (h−1), day d $GSigmaFL_{hd}$ (Geo_Sigma_Forecasted_Load) is the geometric standard deviation in $FDeltaL_{hd}$ over the course of the 24 hours of each day $PeakSparksRatio_{hd}$ (Peak_Sparks_Ratio) can be a measure of the highest day-ahead price of electricity relative to the price of natural gas.

AvPeakFL$_d$ (Average_Peak_Forecasted Load) is the average value of the forecasted load for the day relative to the peak level of forecasted load for the day The remaining variables are defined above herein.

In exemplary embodiments, one or more forecasting equations, such as, for example, equation 4, may include variables relating to the volume of energy traded in the day-ahead electricity market, such as for example, day-ahead hourly volume, the mean daily volume, the coefficient of variation in the daily volume, and the skewness in the volume, to name a few. In some embodiments, for situations regarding power grids where natural gas is not the primary fuel, variables relating to the price of electricity relative to the price of coal may be used in forecasting equation. The price of coal may be normalized in United States Dollars (USD) per Megawatt-hour (MWh) or any other equivalent such as Euros per Megawatt-hour (EUR/MWh), and the like.

For example, power grids such as PJM (PJM Interconnection is a regional transmission organization "RTO" that coordinates the movement of wholesale electricity in all or parts of 13 states and the District of Columbia.) may report the volume of day-ahead generation offers. Therefore variables such as, for example, day-ahead hourly volume, the mean daily volume, the coefficient of variation in the daily volume, and the skewness in the volume, and the like, may be a part in one or more forecasting equations and applied to one or more power grids according to exemplary embodiments described herein.

For example, some day-ahead electricity markets may report the volume of day-ahead market activity (e.g., Elspot in Scandinavia). Therefore variables such as day-ahead hourly volume, the mean daily volume, the coefficient of variation in the daily volume, and the skewness in the volume, and the like, may be a part in one or more forecasting equations and applied to one or more power grids according to exemplary embodiments described herein.

As can be appreciated, the equations described herein are exemplary and various combinations of variables may be used in forecast error equations. In exemplary embodiments, forecast equations using a MFP model may vary across different electricity markets and may, for example, include different variables, coefficients, and/or exponents.

Referring to FIGS. 2A-2B, to accomplish, amongst other things, the above predictions it will be understood that any of competing generators/retailers system 100, output consumers system 102, and/or prediction error system 104 can communicate with each other and/or can be further combined and/or separated. For ease, competing generators/retailers system 100, output consumers system 102, and/or prediction error system 104 are, at times, shown separately. This is merely for ease and is in no way meant to be a limitation.

Still referring to FIGS. 2A-2B, in exemplary embodiments, output consumers system 102 and prediction error system 104 can be separate and/or distinct as shown in FIG. 2A and/or output consumers system 102 and prediction error system 104 can be combined as one step. For ease, the predictions are, at times, disclosed as being affiliated with prediction error system 104. This is merely for ease and is in no way meant to be a limitation.

Further, any element of competing generators/retailers system 100, output consumers system 102, and/or prediction error system 104 can reside on and/or be affiliated with output consumers system 102, competing generators/retailers system 100, prediction error system 104. For example, competing generators/retailers system 100 can be an algorithm stored in processor readable memory that can be accessed and/or processed by a processor affiliated with output consumers system 102. Further still, competing generators/retailers system 100 can reside on and/or be affiliated with prediction error system 104. For example, competing generators/retailers system 100 can be an algorithm stored in processor readable memory that can be accessed and/or processed by a processor affiliated with prediction error system 104.

In exemplary embodiments, competing generators/retailers system 100, output consumers system 102, and/or prediction error system 104 can include, but is not limited to, at least one communication portal; at least one graphical user interface; at least one user input; at least one speaker; at least one processor readable memory; at least one processor; and any other reasonable components for use in communicating information (e.g., data), storing information, and processing any form of information.

In exemplary embodiments, competing generators/retailers system 100, output consumers system 102, and/or prediction error system 104 can be, for example, a mobile phone, computer, networking system, iPad, iPod, iPhone, Smartphone, and Blackberry, to name a few.

Now that exemplary embodiments of the present disclosure have been shown and described in detail, various modifications and improvements thereon will become readily apparent to those skilled in the art.

What is claimed is:

1. A method of adjusting forecast load predictions on an electric grid using one or more operatively connected computers, the method comprising:

obtaining, at the one or more computers from at least one of an energy generation computer system or an energy retailer computer system, electrical grid information comprising:
a day-ahead profile of a forecasted load for the electric grid,
a day-ahead sparks ratio, wherein the day-ahead sparks ratio is the actual day-ahead electricity prices relative to the prices of fuel used to generate electricity,
a day-ahead price profile, and
an hourly forecasted load relative to maximum hourly forecasted load for the day, minimum hourly forecasted load for the day, and average forecasted load for the day;

accessing, from one or more databases operatively connected to the one or computers, electrical grid historical data;

calculating, by the one or more computers, coefficients for an electricity consumption equation by performing a regression analysis using the historical data, the electricity consumption equation being a function of day-ahead sparks ratio, day-ahead price profile, day-ahead profile of forecasted load, hourly forecasted load relative to the forecasted profile, and coefficients of variation and skewness in day-ahead prices and forecasted load;

calculating, by the one or more computers, forecast prediction errors by applying data from the obtained electrical grid information to the electricity consumption equation with the calculated coefficients;

providing, by the one or more computers to one or more computer systems associated with an electric grid system operator, one or more electronic reports containing forecast errors for the electric grid;

calculating, by the one or more computers, one or more residual terms as the differences between i) predicted errors from the historical data using the electricity consumption equation, and ii) actual errors from the historical data;

applying, by the one or more computers, the residual terms to an auto-regressive moving average analysis, so as to determine one or more disturbances at one or more times;

calculating, by the one or more computers, a new set of coefficients for the electricity consumption equation based on the auto-regressive moving average analysis; and controlling operation of a plurality of electric power generators of the electric grid based on the electricity consumption equation with the new set of coefficients.

2. The method of claim 1, wherein the electricity consumption equation is a multivariable fractional polynomial model.

3. The method of claim 1, wherein the electricity consumption equation comprises a Coefficient of Variation variable calculated over a day, using one or more computers, as the ratio of standard deviation of the day-ahead prices to the average hourly price.

4. The method of claim 1, wherein the electricity consumption equation comprises a Positive Skewness variable calculated over a day, using one or more computers, as values equal to the absolute value of the skewness in the day ahead prices.

5. The method of claim 1, wherein the electricity consumption equation comprises a Negative Skewness variable calculated over a day, using one or more computers, as values equal to the absolute value of the skewness in the day ahead prices.

6. The method of claim 1, wherein the electricity consumption equation comprises a Forecasted Load Peak Ratio variable calculated over a day, using one or more computers, as the ratio of the forecasted load to the forecasted peak load.

7. The method of claim 1, wherein the electricity consumption equation comprises a Forecasted Load Nadir Ratio variable calculated over a day, using one or more computers, as the ratio of the forecasted load to the forecasted minimum load.

8. The method of claim 1, wherein the electricity consumption equation comprises a Forecasted Load Peak variable equal to values of the forecasted peak hourly load for a day.

9. The method of claim 1, wherein the electricity consumption equation comprises a Forecasted Load Nadir variable equal to values of the forecasted minimum hourly load for a day.

10. The method of claim 1, wherein the electricity consumption equation comprises a Coefficient of Variation Forecasted Load Variable calculated over a day, using one or more computers, as the ratio of standard deviation of the day prices to the average hourly price.

11. The method of claim 1, wherein the electricity consumption equation comprises a Positive Skewness Forecasted Load Variable calculated, using one or more computers, as equal to the skewness in the day-ahead forecasted hourly load when the skewness is positive.

12. The method of claim 1, wherein the electricity consumption equation comprises a Negative Skewness Forecasted Load variable calculated, using one or more computers, as equal the absolute skewness in the day-ahead forecasted hourly load when the skewness is negative.

13. The method of claim 1, wherein the electricity consumption equation comprises a Forecasted Delta Load variable calculated over a day, using one or more computers, as equal to the ratio of a forecasted load at a first time to a forecasted load at previous time.

14. The method of claim 13, wherein the electricity consumption equation comprises a Geo Sigma Forecasted Load variable calculated over a day, using one or more computers, as the geometric standard deviation of the Forecasted Delta Load variable.

15. The method of claim 1, wherein the electricity consumption equation comprises a Peak Sparks Ratio variable equal to the ratio of the highest day-ahead price of electricity relative to the price of a fuel used to generate electricity.

16. The method of claim 1, wherein the electricity consumption equation comprises an Average Peak Forecasted Load variable calculated as, using one or more computers, as the average value of the forecasted load for the day relative to the peak level of the forecasted load for the day.

17. The method of claim 1, wherein the electricity consumption equation comprises a day-ahead hourly volume of energy traded variable.

18. The method of claim 1, wherein the electricity consumption equation comprises a mean daily volume of energy traded variable.

19. The method of claim 1, wherein the electricity consumption equation comprises a coefficient of variation in the daily volume of energy traded variable.

20. The method of claim 1, wherein the electricity consumption equation comprises a skewness in the volume of energy traded variable.

21. The method of claim 1, wherein the fuel is natural gas.

22. The method of claim 1, wherein the fuel is coal.

23. The method of claim 1, wherein the fuel is oil.

* * * * *